United States Patent
Nylén

[11] 3,914,632
[45] Oct. 21, 1975

[54] COMMUTATOR FOR ELECTRIC MACHINES AND METHOD OF MAKING SUCH A COMMUTATOR

[75] Inventor: Olle Nylén, Huddinge, Sweden

[73] Assignee: Aktiebolaget Electrolux, Stockholm, Sweden

[22] Filed: Apr. 5, 1974

[21] Appl. No.: 458,340

[30] Foreign Application Priority Data
Apr. 6, 1973    Sweden .............................. 7304875

[52] U.S. Cl. ................................ 310/234; 310/235
[51] Int. Cl.² ...................................... H02K 39/16
[58] Field of Search .......... 310/233, 234, 235, 236, 310/237, 219–230

[56] References Cited
UNITED STATES PATENTS

| | | | |
|---|---|---|---|
| 2,256,321 | 9/1941 | McCusker | 310/235 |
| 2,357,111 | 8/1944 | Hemphill | 310/236 |
| 3,080,615 | 3/1963 | Carlson | 310/235 |
| 3,447,011 | 5/1969 | Amrein | 310/236 |
| 3,566,460 | 3/1971 | Yamaguchi | 310/236 |
| 3,590,296 | 6/1971 | Dumez | 310/234 |
| 3,593,052 | 7/1971 | Hoffman | 310/236 |
| 3,659,130 | 4/1972 | Lilley | 310/236 |
| 3,668,449 | 6/1972 | King | 310/236 |
| 3,717,928 | 2/1973 | Yamaguchi | 310/235 |
| 3,726,003 | 4/1973 | Hellmann | 310/237 |

*Primary Examiner*—R. Skudy
*Attorney, Agent, or Firm*—Alfred E. Miller

[57] ABSTRACT

A commutator for an electric machine, for example a motor, in which commutator segments are provided with bent-over hooks around which are looped electrically conductive rotor wires. Wedge-shaped cuts are made in the supporting cylinder for alternate commutator segments so that rotor wire ends connected to adjacent segments are located at different distances from the rotary shaft of the commutator.

2 Claims, 3 Drawing Figures

COMMUTATOR FOR ELECTRIC MACHINES AND METHOD OF MAKING SUCH A COMMUTATOR

BACKGROUND OF THE INVENTION

This invention relates to a commutator for electric machines and having an even number of segments, each segment having a hook-shaped part about which the end of a rotor wire is looped, the said end being conductively connected to the said part by combined pressing and welding. The invention also relates to a method of making such a commutator.

In commutators of the type referred to the rotor wire ends looped about two adjacent segment hooks will lie very close together. In known manner an insulated copper wire is used for the rotor winding and the insulation of each wire end is removed so as to provide connection to the relevant segment. Particularly in commutators of small size the risk of short-circuiting between adjacent wire and hence of an undesirable connection between different winding parts is evident.

To eliminate the risk of short-circuiting, the commutator according to this invention is mainly characterized in that under every second hook-shaped part of the commutator a wedge-shaped cut is made, the bottom of which supports the hook-shaped part with enclosed wire end such that wires ends connected to adjacent segments are situated at different distances from the rotary shaft of the commutator.

The invention will be described below with reference to the accompanying drawing, which by way of example shows an embodiment of the invention.

FIG. 1 is a perspective view of a commutator;
FIG. 2 is a section on the line II—II of FIG. 1; and
FIG. 3 is a perspective view of two adjacent commutator segments on an enlarged scale.

DESCRIPTION OF THE PREFERRED EMBODIMENT

Figure 1:
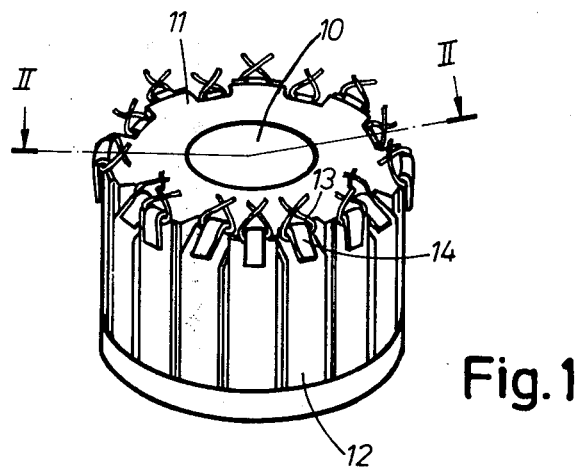
Figure 2:
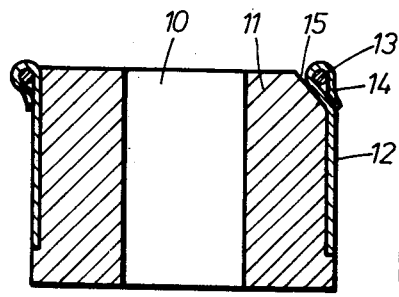
Figure 3:
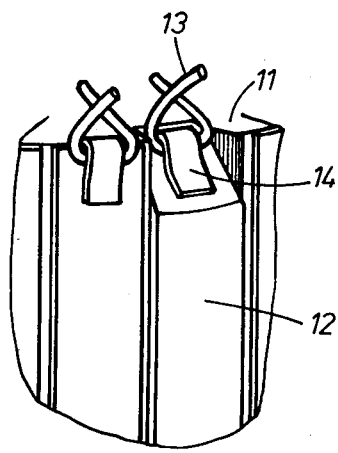

The commutator shown comprises a cylinder 11 of electrically non-conductive material and with a through hole 10. On the mantle surface of the cylinder 11 segments 12 of electrically conductive material are arranged. Connection between the wire end 13 and the segment 12 is established by one end of the segment 12 being bent to form a hook 14. The insulation of the end 13 is removed and the end is looped about the hook 14 and connected to the segment by a weld.

A wedge-shaped cut 15 is made under every second hook 14. During welding the welding tool forces the hook 14 and the wire end 13 against the bottom of the cut. In that way the wire ends 13 of two adjacent segments will be situated at different distances from the rotary shaft of the commutator and cannot come into contact with each other. Thus, the risk of short-circuiting between different winding parts has been eliminated.

What is claimed is:

1. A commutator for an electrically operated device comprising an electrically non-conductive cylindrically shaped body provided with a substantially centrally located thorough hole, a plurality of even numbered electrically conductive segments each being adapted to be secured to a corresponding end of a rotor wire, said segments being arranged circumferentially on said body, one of the ends of each of the conductive segments being provided with means for attaching the respective rotor wire thereto, a wedge-shaped cut being provided under every other attachment means whereby each attachment means over the wedge-shaped cut is bent backward to a position in which it is located at a shorter distance from said through hole of the commutator than the adjacent attachments means to thereby substantially eliminate the possibility of short-circuiting between adjacent attachment means.

2. A commutator as claimed in claim 1 wherein each attachment means in a hook-shaped member.

* * * * *